UNITED STATES PATENT OFFICE.

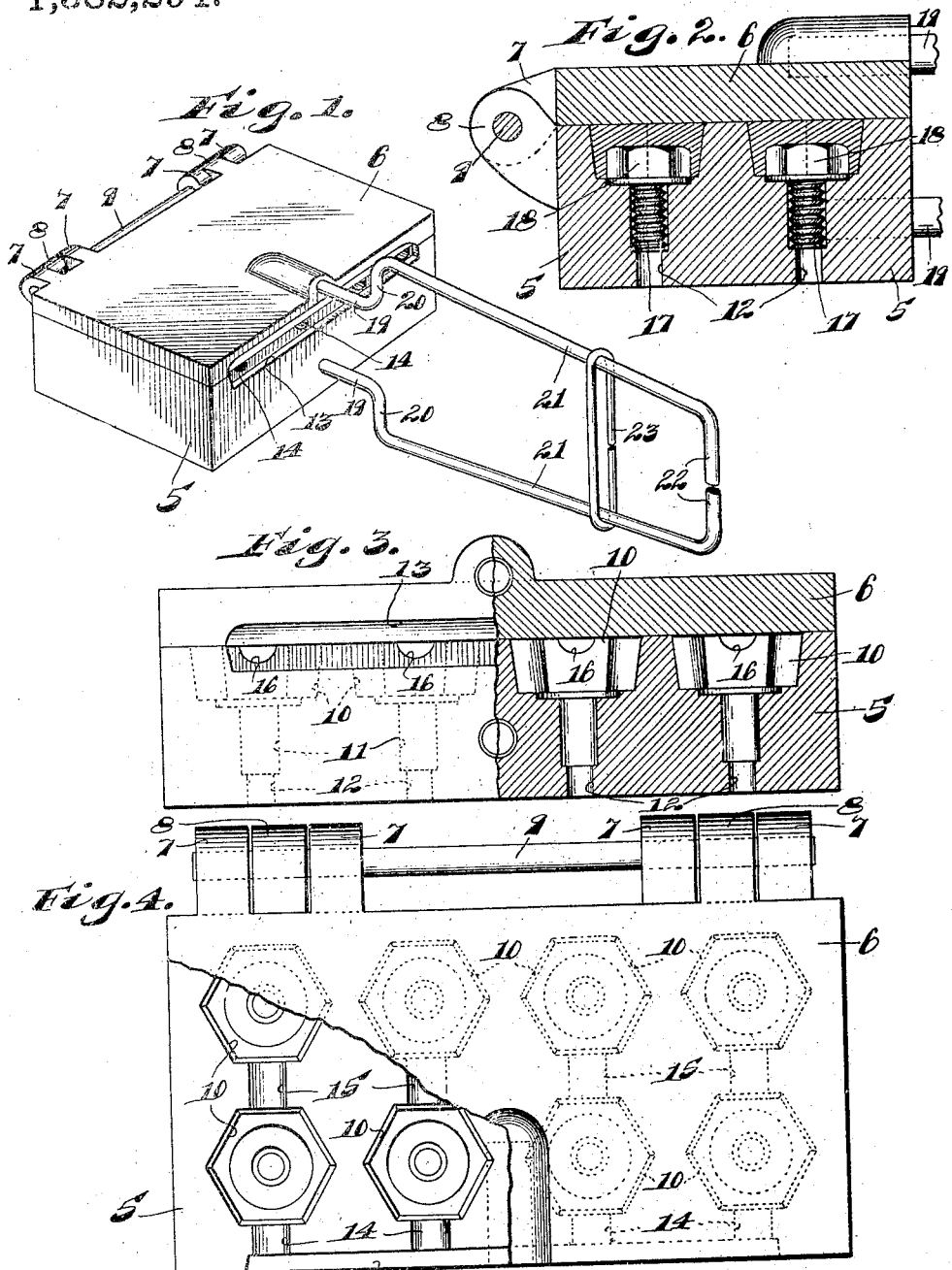

EDWARD J. KUKAC, OF CHICAGO, ILLINOIS.

HAND-MOLD.

1,382,294.

Specification of Letters Patent.  Patented June 21, 1921.

Application filed September 25, 1919. Serial No. 326,224.

*To all whom it may concern:*

Be it known that I, EDWARD J. KUKAC, a citizen of the United States, and a resident of the city of Chicago, county of Cook, and State of Illinois, have invented certain new and useful Improvements in Hand-Molds, of which the following is a specification.

My invention relates to new and useful improvements in hand molds, and has for its object the provision of a hand mold by means of which a lead coating may be cast upon the heads of bolts.

Other objects will appear hereinafter.

The invention consists in the combinations and arrangements of parts hereinafter described and claimed.

The invention will be best understood by reference to the accompanying drawings forming a part of this specification, and in which, Figure 1 is a perspective view of my invention.

Fig. 2 is a transverse vertical sectional view of my invention.

Fig. 3 is a front elevational view of my invention, with parts removed.

Fig. 4 is a top plan view of my invention, with parts removed.

The approved form of construction consists of a bottom portion 5 which corresponds to a drag in the ordinary molding flask. Coöperating with the member 5 is a cover 6 which corresponds to the cope of the flask. The members 5 and 6 are hingedly connected together by means of the rearwardly extending knuckles 7 and 8, and the pin 9. Formed in the member 5 are hexagonal molds 10, projecting downwardly from the center of which are cylindrical passages 11, the lower ends of said passages being reduced to form the reduced portion 12. Formed in the members 5 and 6, adjacent the coöperating edges, is a groove 13, from which extend ingates which communicate with the molds 10. As clearly shown in Fig. 4, the molds 10 are arranged in two parallel rows, and an ingate 14 communicates with each of the molds in the first row, and a secondary ingate 15 connects the second row of molds with the first. Where the ingate communicates with the mold, there is thus formed a semi-circular recess 16. My invention is used primarily for coating with lead the heads of bolts which are used to secure the terminal posts on storage batteries. These bolts are generally formed from brass and provided with a lead head which protects the brass material from the action of the acid. In coating the bolt heads with my device, the bolt 17 having the head 18, is placed within the mold 10, the threaded portion of the bolt extending downwardly into the passage 11. As clearly seen in Fig. 2, the bolt head 18 is smaller than the mold 10, so that, upon the filling of the mold 10 with molten lead, a substantial coating of lead is applied to the head 18. Secured to the front side of the members 5 and 6 are handles 19, which are formed of some suitable resilient metal. As clearly shown, the handle 19 extends outwardly from the side of the members 5 and 6, to which attached, and then is offset so as to form a perpendicularly extending portion 20, the handle again being offset to form the longitudinally extending portion 21, and the extreme outer ends of the members 21 are bent inwardly to form portions 22. As clearly shown in Fig. 1, the members 21 are not parallel, but are converging toward the outer end, and as shown, when the members 5 and 6 are in close engagement, that is, when the member 6 is serving as a cover for the member 5, the adjacent ends of the members 22 are not in contact. A suitable sleeve 23 is provided, which is adapted to be inserted upon the members 22 and moved inwardy toward the members 5 and 6, thereby securely holding the members 5 and 6 in close engagement with each other. By forming the handle members of a suitable resilient material, the members 5 and 6 are clamped together securely, but are allowed to separate a trifle upon the molten metal being poured in, this separation acting against the strain imparted to the members 5 and 6 by the resilient handle, as will be readily understood. The passage 12 serves as a means for removing the bolts from the hand mold after the lead coating has been cast upon the heads of the same. By my invention I have provided a hand mold which is simple in structure and durable and highly efficient in use, and especially useful where it is necessary to have a bolt provided with a lead head immediately. My device provides a means whereby the person operating a garage or other business where storage batteries are used, may cast the lead coating upon the head of the bolt at his shop quickly and with very little expense.

While I have illustrated and described the preferred form of construction for carrying my invention into effect, this is capable of variation and modification without departing from the spirit of the invention. I therefore, do not wish to be limited to the precise details of the construction set forth, but desire to avail myself of such variations and modifications as come within the scope of the appended claims.

Having described my invention, what I claim as new and desire to secure by Letters Patent, is:—

1. A hand mold comprising, a mold bearing member having passages communicating with the molds in said member and the exterior of said member; a cover hingedly connected to said member, adapted in operative position to engage the upper surface thereof; and means, including resilient handles, for yieldingly retaining said cover in said engaging relation, substantially as described.

2. A device of the class described comprising, a member having molds and passages extending from said molds to the lower face of said member, said member having ingates projecting inwardly from one of the lateral faces thereof and communicating with said molds; a cover hingedly connected to said member and adapted, when operative, to lie in engagement with the upper surface of said member, said cover and said member having a groove, adjacent the coöperating edges, communicating with said ingates, and means including handles mounted at the sides of the groove for retaining said cover in said engaging position with said member, substantially as described.

3. A device of the class described comprising, a mold bearing member, having an elongated slot in one of the lateral faces thereof communicating by means of ingates with the said molds; a cover hingedly connected to said member; resilient handles projecting outwardly from said cover and said member; and means coöperating with said handles for resiliently retaining said cover in operative relation to said member, substantially as described.

4. A hand mold comprising, a mold bearing member having molds of bolt heads formed therein, which communicate, by means of lateral ingates, with an exterior groove, said member having downwardly extending passages communicating with said molds, said downwardly extending passages being reduced and communicating with the exterior of said member; a cover mounted on said member; and resilient handles and a holding member for retaining said cover in operative relation to said member, substantially as described.

In testimony whereof I have signed my name to this specification in the presence of two subscribing witnesses.

EDWARD J. KUKAC.

Witnesses:
JOSHUA R. H. POTTS,
LAURA J. ERICKSON.